United States Patent
Nakane (10) Patent No.: US 11,938,519 B2
(45) Date of Patent: Mar. 26, 2024

(54) OPTICAL CONNECTOR CLEANING TOOL AND METHOD OF CLEANING OPTICAL CONNECTOR

(71) Applicant: Fujikura Ltd., Tokyo (JP)

(72) Inventor: Junichi Nakane, Chiba (JP)

(73) Assignee: Fujikura Ltd., Tokyo (JP)

( * ) Notice: Subject to any disclaimer, the term of this patent is extended or adjusted under 35 U.S.C. 154(b) by 799 days.

(21) Appl. No.: 17/046,962

(22) PCT Filed: Dec. 14, 2018

(86) PCT No.: PCT/JP2018/046058
§ 371 (c)(1),
(2) Date: Oct. 12, 2020

(87) PCT Pub. No.: WO2019/198273
PCT Pub. Date: Oct. 17, 2019

(65) Prior Publication Data
US 2021/0146405 A1 May 20, 2021

(30) Foreign Application Priority Data
Apr. 12, 2018 (JP) ................. 2018-076622

(51) Int. Cl.
*B08B 1/00* (2006.01)
*B08B 7/00* (2006.01)

(52) U.S. Cl.
CPC .............. *B08B 1/00* (2013.01); *B08B 7/0028* (2013.01); *B08B 2240/02* (2013.01)

(58) Field of Classification Search
CPC ........... B08B 1/04; B08B 1/006; B08B 1/008; G02B 6/3898; G02B 6/3807; G02B 6/3866
See application file for complete search history.

(56) References Cited

U.S. PATENT DOCUMENTS

| | | | |
|---|---|---|---|
| 2014/0144468 A1 | 5/2014 | Nakane | |
| 2016/0334585 A1 | 11/2016 | Thornton, Jr. | |
| 2017/0351039 A1 | 12/2017 | Nakane et al. | |

FOREIGN PATENT DOCUMENTS

| | | | |
|---|---|---|---|
| CN | 103797390 | A | 5/2014 |
| CN | 104056793 | A | 9/2014 |
| CN | 105122108 | A | 12/2015 |
| EP | 2 400 325 | A1 | 12/2011 |
| JP | 2003-232962 | A | 8/2003 |
| JP | 4101486 | B2 | 6/2008 |
| JP | 4579330 | B2 | 11/2010 |
| JP | 2011186082 | A | 9/2011 |
| JP | 2014035489 | A | 2/2014 |
| JP | 5439557 | B2 | 3/2014 |
| JP | 2014-081445 | A | 5/2014 |
| JP | 2017049397 | A | 3/2017 |
| WO | 2014024985 | A1 | 2/2014 |

*Primary Examiner* — Shay Karls
(74) *Attorney, Agent, or Firm* — Osha Bergman Watanabe & Burton LLP (57) ABSTRACT

An optical connector cleaning tool includes: a tool body; and an extension that moves relatively with respect to the tool body. The extension extends out of the tool body and includes a head that presses a cleaning element formed with a tape-like adhesive element onto an optical connector. A relative movement of the extension with respect to the tool body carries the cleaning element to the head, and after carrying the cleaning element to the head, enables the cleaning element to contact the optical connector.

10 Claims, 6 Drawing Sheets

OPTICAL CONNECTOR CLEANING TOOL AND METHOD OF CLEANING OPTICAL CONNECTOR

TECHNICAL FIELD

The present invention relates to an optical connector cleaning tool and a method of cleaning an optical connector.

BACKGROUND

Connection of an optical connector is achieved when end portions of optical fibers are made to abut against each other at a ferrule endface. In this case, when a connecting end face is contaminated, such contamination may be a cause of damage to the connecting end face when the optical connector is connected, and a cause of an increase of transmission losses. For this reason, the connecting end face has hitherto been cleaned by using an optical connector cleaning tool.

As such an optical connector cleaning tool, for example, Patent Literature 1 discloses an optical connector cleaning tool that includes a head across which an adhesive tape extends. The tape comes into contact with the connecting end face, the tape is pressed onto the connecting end face side by the head, and the tape adsorbs foreign materials adhering to the connecting end face. In this manner, the connecting end face can be cleaned. Further, in Patent Literature 1, when the tape is taken up in a certain direction, the tape is carried on the head in the certain direction. This configuration can prevent the tape that has adsorbed foreign materials from coming into contact with the connecting end face again, and an adhesive force of the adhesive surface from reducing.

PATENT LITERATURE

Patent Literature 1: JP 2014-081445A

In the optical connector cleaning tool disclosed in Patent Literature 1, an operation of causing the tape to come into contact with the connecting end face and using the head to press the tape onto the connecting end face side and an operation of carrying a used portion of the tape that has adsorbed foreign materials to be fed to the downstream side need to be performed separately from each other. For example, in a cleaning operation of the optical connector, an operation of manually rotating a take-up reel to feed a used portion of the tape to the downstream side and carry an unused portion of the tape to the head and an operation of pressing the portion of the tape that has been carried to the head onto the connecting end face cannot be performed in series in a single operation. Accordingly, reduction in operation efficiency of the entire cleaning operation has been presenting an issue.

SUMMARY

One or more embodiments of the present invention provide an optical connector cleaning tool capable of efficiently performing a cleaning operation when an optical connector is cleaned by using a cleaning element formed with a tape-like adhesive element.

Some embodiments of the present invention include an optical connector cleaning tool comprising: a tool body; and an extension part configured to relatively move with respect to the tool body, the extension part extending out of the tool body, wherein the extension part includes a head that presses a cleaning element formed with a tape-like adhesive element onto an optical connector, and a relative movement between the tool body and the extension part is used to carry the cleaning element to the head, and to enable the cleaning element to come into contact with the optical connector after the cleaning element is carried to the head.

Other features of one or more embodiments of the present invention are made clear by the following description and the drawings.

With some embodiments of the present invention, the cleaning operation can be efficiently performed when the optical connector is cleaned by using the cleaning element formed with the tape-like adhesive element.

DETAILED DESCRIPTION

At least the following matters are made clear from the following description and the drawings.

An optical connector cleaning tool will become clear, comprising: a tool body; and an extension part (i.e., "extension") configured to relatively move with respect to the tool body, the extension part extending out of the tool body, wherein the extension part includes a head that presses a cleaning element formed with a tape-like adhesive element onto an optical connector, and a relative movement between the tool body and the extension part is used to carry the cleaning element to the head, and to enable the cleaning element to come into contact with the optical connector after the cleaning element is carried to the head. According to the optical connector cleaning tool as described above, the cleaning operation can be efficiently performed when the optical connector is cleaned by using the cleaning element formed with the tape-like adhesive element.

In one or more embodiments, the extension part includes a blocking part, the blocking part inhibits (i.e., prevents) the cleaning element from coming into contact with the optical connector during carrying the cleaning element to the head, and after carrying the cleaning element to the head, the inhibition of the blocking part is released, and the cleaning element is enabled to come into contact with the optical connector. With this configuration, the cleaning element can be prevented from being carried to the head while the cleaning element remains in contact with the optical connector.

In one or more embodiments, the blocking part and the head are configured to relatively move, and the relative movement between the blocking part and the head is used to shift a state from a state in which the blocking part inhibits the cleaning element from coming into contact with the optical connector to a state in which the inhibition of the blocking part is released and the cleaning element is enabled to come into contact with the optical connector. With this configuration, in a single operation of the relative movement between the blocking part and the head, the state in which the blocking part inhibits the cleaning element from coming into contact with the optical connector can be released.

In one or more embodiments, an endface of the blocking part projects toward a side of the optical connector further than an endface of the head while the cleaning element is carried to the head. With this configuration, the cleaning element can be prevented from being carried to the head while the cleaning element remains in contact with the optical connector.

In one or more embodiments, the endface of the head is exposed to a side of the optical connector when a positional relationship between the blocking part and the head is changed after the cleaning element is carried to the head. With this configuration, in a single operation of the relative movement between the blocking part and the head, the cleaning element is enabled to come into contact with the optical connector.

In one or more embodiments, the endface of the head is exposed to a side of the optical connector when the blocking part retracts with respect to the head after the cleaning element is carried to the head. With this configuration, in a single operation of the relative movement between the blocking part and the head, the cleaning element is enabled to come into contact with the optical connector.

In one or more embodiments, the endface of the head is exposed to a side of the optical connector when the head is moved forward with respect to the blocking part after the cleaning element is carried to the head. With this configuration, in a single operation of the relative movement between the blocking part and the head, the cleaning element is enabled to come into contact with the optical connector.

In one or more embodiments, the optical connector cleaning tool further comprises: a first spring being provided between the tool body and the extension part, the first spring being configured to restore a positional relationship between the tool body and the extension part; and a second spring being provided on a side opposite to the optical connector with respect to the blocking part, the second spring being configured to restore a positional relationship between the blocking part and the head. With this configuration, the positional relationship between the tool body and the extension part and the positional relationship between the blocking part and the head can be easily restored.

In one or more embodiments, a load on the first spring at a time when the carrying of the cleaning element to the head is completed is smaller than a load on the second spring at a time when the cleaning element is enabled to come into contact with the optical connector. With this configuration, in a single operation of the relative movement between the tool body and the extension part, the state in which the blocking part inhibits the cleaning element from coming into contact with the optical connector can be released.

A method of cleaning an optical connector by using an optical connector cleaning tool will become clear, including a tool body, and an extension part configured to relatively move with respect to the tool body, the extension part extending out of the tool body, the extension part including a head that presses a cleaning element formed with a tape-like adhesive element onto the optical connector, the method comprising: by using the relative movement between the tool body and the extension part, carrying the cleaning element to the head, and enabling the cleaning element to come into contact with the optical connector after the cleaning element is carried to the head. According to the method of cleaning the optical connector as described above, the cleaning operation can be efficiently performed when the optical connector is cleaned by using the cleaning element formed with the tape-like adhesive element.

First Embodiment

Overview of Optical Connector Cleaning Tool:
Overall Configuration

Figure 1:
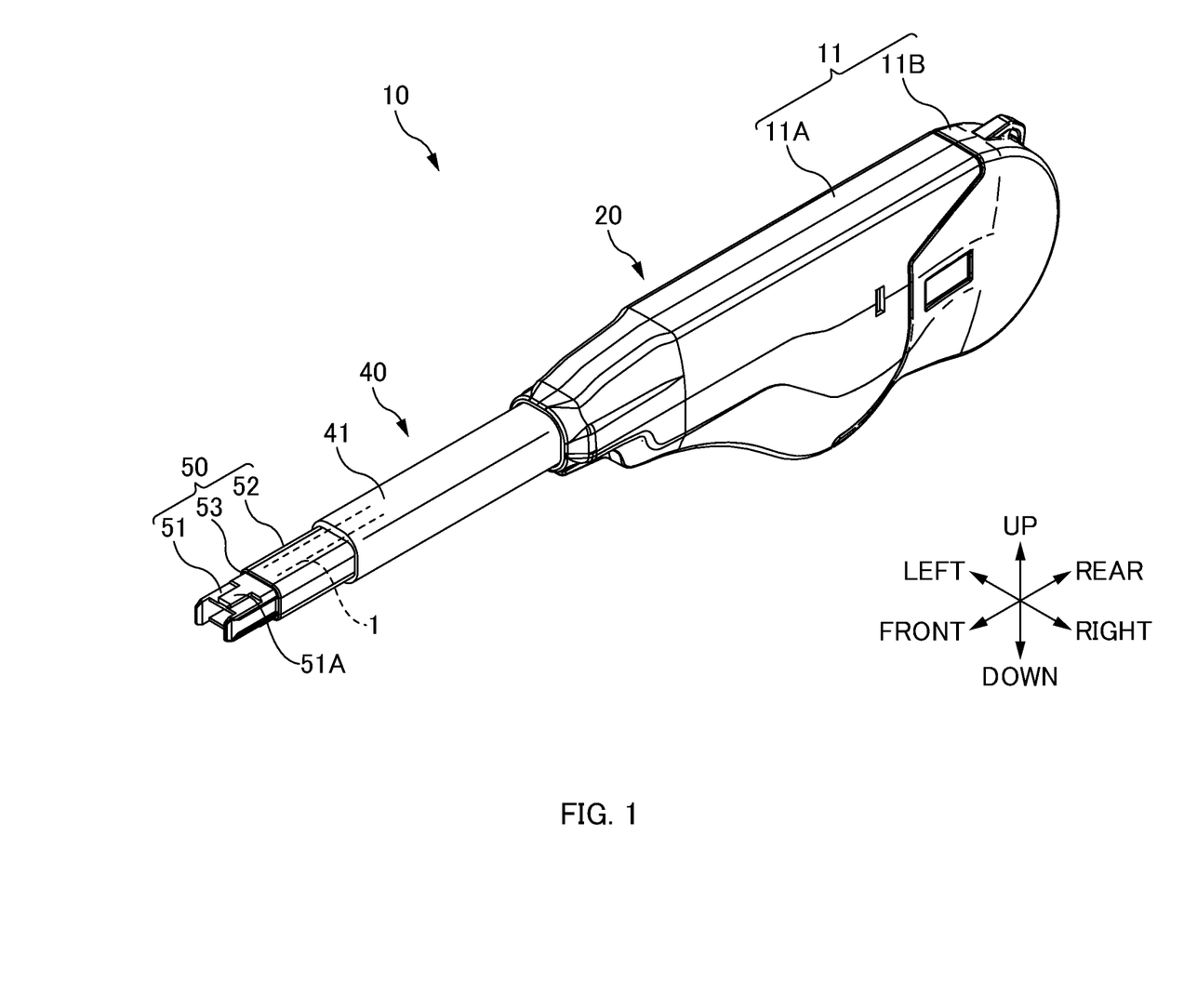
FIG. 1 is an overall perspective view of an optical connector cleaning tool 10 (first embodiment).

FIG. 1 is an overall perspective view of an optical connector cleaning tool 10 (first embodiment). FIGS. 2A-2D are each a diagram illustrating a state in which an optical connector 90 is cleaned by the optical connector cleaning tool 10 (first embodiment).

In the following description, directions will be defined as illustrated in the drawings. Specifically, a direction in which an extension part 40 extends from a tool body 20 is defined as a "front-rear direction"; the extension part 40 side as seen from the tool body 20 is defined as a "front" side, and the opposite side thereof is defined as a "rear" side. An axial direction of a rotation shaft (take-up reel support shaft 23) of a take-up reel 30 (not illustrated in FIG. 1 and FIGS. 2A-2D, see FIG. 4 to be described later) present in the tool body 20 is defined as a "left-right direction", the right-hand side as seen from the front side is defined as a "right" side, and the opposite side thereof (left-hand side) is defined as a "left" side. A direction perpendicular to the "front-rear direction" and the "left-right direction" is defined as an "up-down direction", a side provided with a protrusion (key 51A) to be inserted into a keyway of an optical adapter to which the optical connector is connected is defined as an "upper" side, and the opposite side thereof is defined as a "lower" side. The terms "upstream" and "downstream" may be used in accordance with a direction of feeding a cleaning element 1 (see FIG. 2B).

The optical connector cleaning tool 10 is a tool for cleaning a ferrule endface being a connecting end face of the optical connector and an end portion of an optical fiber that is retained on the ferrule. Note that, in the following description, the optical connector cleaning tool may be simply referred to as a "cleaning tool".

The cleaning tool 10 includes a cover 11 (a front cover 11A and a rear cover 11B), a tool body 20, and an extension part 40.

The cover 11 is a member that houses the tool body 20 and a part (rear-side part) of the extension part 40. As illustrated in FIG. 1, a part (front-side part) of the extension part 40 extends out of an opening that is provided on the front side of the front cover 11A, so as to be exposed to the outside of the cover 11. When the optical connector is cleaned by using the cleaning tool 10, an operator holds the tool body 20 with the cover 11. Note that, as illustrated in FIG. 1, the cover 11 is formed with a front cover 11A and a rear cover 11B. Note that, in the cover 11, the front cover 11A and the rear cover 11B may be integrally formed. The cleaning tool 10 need not include the cover 11. In this case, when the optical connector is cleaned by using the cleaning tool 10, an operator directly holds the tool body 20.

The tool body 20 is a member that houses a feeding mechanism (described later) that carries the cleaning element 1 to the extension part 40 (a pressing surface of a head 60 to be described later). As described above, the tool body 20 is housed in the cover 11. Note that a detailed configuration of the tool body 20 will be described later.

The extension part 40 is a member that is movable in the front-rear direction with respect to the tool body 20. As described above, the rear-side part of the extension part 40 is housed in the cover 11, and the front-side part of the extension part 40 extends out of the opening provided on the front side of the front cover 11A so as to be exposed to the outside of the cover 11. The extension part 40 includes a tube body 41, a blocking part 50, and a head 60 (not illustrated in FIG. 1, see FIGS. 2A-2D and FIG. 4 to be described later).

The tube body 41 is a part that internally houses the head 60, and a head support part 70 (described later) to which the head 60 is connected. On the front side, the tube body 41 retains the blocking part 50 so as to be movable in the front-rear direction. The rear side of the tube body 41 is retained so as to be movable in the front-rear direction with respect to a housing 21 (described later) of the tool body 20.

The blocking part 50 is a part that covers a front end portion of the head 60. The rear side of the blocking part 50 is retained so as to be movable in the front-rear direction with respect to the tube body 41. The blocking part 50 includes a tip end portion 51, a trunk part 52, and a shoulder part 53. The tip end portion 51 is a part that is to be inserted into a connector housing hole of the optical adapter at the time of cleaning of the optical connector. The trunk part 52 is a part that projects outwardly from an outer surface of the tip end portion 51. Note that an outer circumference of the trunk part 52 is formed to be larger than an inner circumference of the connector housing hole of the optical adapter. The shoulder part 53 is a part that connects the tip end portion 51 and the trunk part 52 to each other. When the tip end portion 51 is inserted into the connector housing hole of the optical adapter and the blocking part 50 is moved toward the optical connector side at the time of cleaning of the optical connector, the shoulder part 53 comes into abutment against the rim of the connector housing hole of the optical adapter, in such a manner that the blocking part 50 cannot be moved toward the front side (toward the optical connector side) any further.

The head 60 (not illustrated in FIG. 1, see FIGS. 2A-2D and FIG. 4 to be described later) is a member that presses the cleaning element 1 onto the optical connector. The head 60 is housed inside the tube body 41 and the blocking part 50. Note that, in the cleaning tool 10 in a state illustrated in FIG. 1 (a normal state to be described later), the head 60 retracts toward the rear side with respect to a front endface of the blocking part 50 (tip end portion 51). A front end portion of the head 60 is provided with a pressing surface (see FIGS. 2A-2D) for pressing the cleaning element 1 onto the optical connector. Further, the cleaning element 1 supplied from a feeding mechanism (described later) extends across the pressing surface of the head 60. Note that the cleaning element 1 extending across the pressing surface of the head 60 is taken up by the feeding mechanism (described later).

Carrying of Cleaning Element 1 to Head 60

Figure 2A:
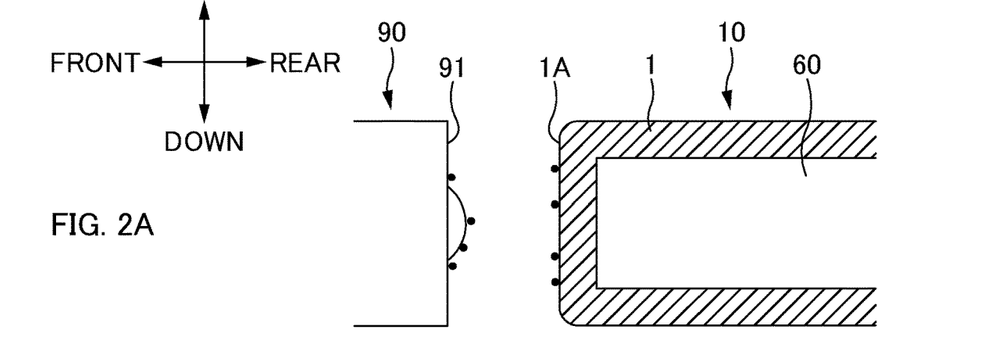
FIGS. 2A-2D are each a diagram illustrating a state in which an optical connector 90 is cleaned with the optical connector cleaning tool 10 (first embodiment).

The cleaning element 1 used in the cleaning tool 10 according to one or more embodiments is a member for cleaning the ferrule endface of the optical connector. The cleaning element 1 used in one or more embodiments is formed as an adhesive element for adsorbing foreign materials on the ferrule endface of the optical connector. Note that the adhesive element forming the cleaning element 1 has self-adhesiveness. Here, self-adhesiveness refers to a property that bonding strength with respect to a member other than the cleaning element 1 is smaller than cutting strength of the cleaning element 1, so that a material forming the cleaning element 1 is not conveyed to the other member even when the cleaning element 1 bonded to the other member is stripped off. In one or more embodiments, as illustrated in FIG. 2A, an endface of the cleaning element 1 facing the ferrule endface 91 serves as a contact surface 1A. Foreign materials on the ferrule endface 91 are removed by bringing the contact surface 1A into contact with the ferrule endface 91 and causing the adhesive surface to adsorb the foreign materials on the ferrule endface 91. When the cleaning element 1 is brought into contact with the ferrule endface and is then stripped off, a part of the cleaning element 1 is not conveyed to the ferrule endface 91.

The adhesive element forming the cleaning element 1 is made of an adhesive member that is made of a silicone-based adhesive material in order to cause foreign materials to adhere to the adhesive element. The adhesive element may be formed by mixing an adhesive material into a main material, for example. As the main material, for example, copolymer containing polyolefin such as polyethylene and polypropylene or a monomer or the like can be used. As the adhesive material to be mixed into the main material, for example, natural rubber, synthetic rubber such as butyl rubber and acrylic rubber, a mixture of polyvinyl chloride and a plasticizer, or the like can be used.

Figure 2B:
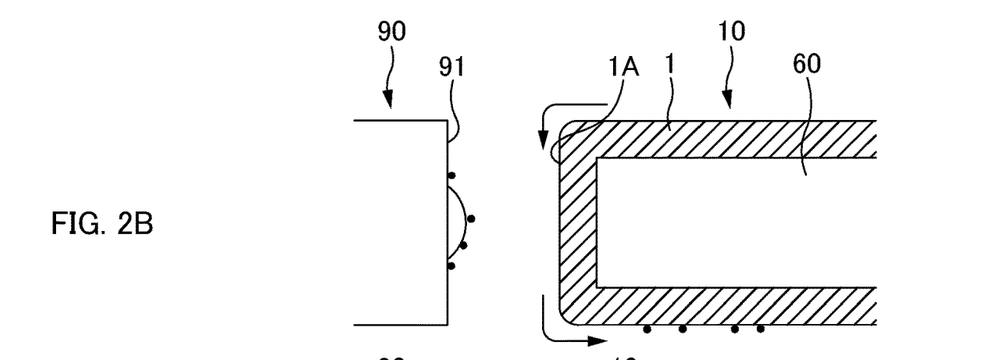

As illustrated in FIGS. 2A-2D, the cleaning element 1 used in the cleaning tool 10 according to one or more embodiments is formed into a tape-like shape. The cleaning element 1 formed into a tape-like shape extends across the head 60. Further, as illustrated in FIG. 2B, an unused portion of the cleaning element 1 can be supplied to the head 60 from the upstream side of the contact surface 1A, and a used portion of the cleaning element 1 can be fed to the downstream side of the contact surface 1A. In the following description, the contact surface 1A that has undergone at least one time of operation in which the contact surface 1A comes into contact with the ferrule endface 91 and the contact surface 1A is stripped off the ferrule endface 91 may be referred to as a "used" portion of the cleaning element. The contact surface 1A that has not undergone even one time of the operation in which the contact surface 1A comes into contact with the ferrule endface 91 and the contact surface 1A is stripped off the ferrule endface 91 may be referred to as an "unused" portion of the cleaning element. When an unused portion of the cleaning element 1 is used to perform cleaning and the unused portion turns to a used portion of the cleaning element 1, an adhesive force of the contact surface 1A may be reduced due to adsorption of foreign materials onto the contact surface 1A. In this case, an unused portion of the cleaning element 1 needs to be supplied from the upstream side of the contact surface 1A and the used portion of the cleaning element 1 needs to be fed to the downstream side of the contact surface 1A. An operation in which an unused portion of the cleaning element 1 is supplied from the upstream side of the contact surface 1A or a used portion of the cleaning element 1 is fed to the downstream side of the contact surface 1A may be collectively referred to as "carrying" of the cleaning element 1. A direction in which the cleaning element 1 is carried may be referred to as a "carrying direction".

Further, one surface of the cleaning element 1 used in the cleaning tool 10 according to one or more embodiments is formed as an adhesive surface that is formed with the adhesive element having self-adhesiveness, and the other surface is formed as a non-adhesive surface not having adhesiveness. In the cleaning element 1 illustrated in FIGS. 2A-2D, a surface on the outer side (side to come into contact with the optical connector 90) is formed as an adhesive surface, and a surface on the inner side (side to come into contact with the head 60) is formed as a non-adhesive surface. Thus, because the surface on the side to come into contact with the head 60 is formed as a non-adhesive surface, the cleaning element 1 can be moved along the head 60 as illustrated in FIG. 2B without adhering to the head 60.

FIGS. 2A-2D each illustrate a state in which the ferrule endface 91 of the optical connector 90 is cleaned by using the cleaning tool 10 according to one or more embodiments that uses the cleaning element 1 formed with the tape-like adhesive element. Here, the ferrule of the optical connector 90 to be cleaned is a lens-combined ferrule. The lens-combined ferrule is such a ferrule that can optically connect end portions of optical fibers to each other without physically bringing the end portions into contact by using a lens that allows light to enter and exit the end portions of the optical fibers. As illustrated in FIGS. 2A-2D, a lens is disposed on the ferrule endface 91 of the lens-combined ferrule. Accordingly, the ferrule endface 91 is not formed entirely flat, but has a protrusion at the portion where the lens is disposed. When the ferrule endface having a protrusion as described above is used, the entire ferrule endface can be more appropriately cleaned by pressing the adhesive element onto the ferrule endface than by wiping the ferrule endface using a cleaning cloth or a cleaning thread. In this regard, because the cleaning tool 10 according to one or more embodiments uses the cleaning element 1 formed with the tape-like adhesive element, the cleaning tool 10 can more easily bring the cleaning element 1 into contact with the entire ferrule endface 91 including the lens part. Note that the ferrule of the optical connector 90 need not be a lens-combined ferrule.

FIG. 2A illustrates a state before the ferrule endface 91 of the optical connector 90 is cleaned. As illustrated in FIG. 2A, foreign materials are adsorbed onto the contact surface 1A. In other words, the cleaning element 1 remains being used. Thus, if the contact surface 1A is brought into contact with the ferrule endface 91 in this state, the contact surface 1A having a reduced adhesive force is brought into contact with the ferrule endface 91. Accordingly, foreign materials may not be appropriately adsorbed. If the contact surface 1A is brought into contact with the ferrule endface 91 in this state, foreign materials adsorbed onto the contact surface 1A may adhere to the ferrule endface 91 again. For this reason, an unused portion of the cleaning element 1 needs to be supplied from the upstream side of the contact surface 1A and the used portion of the cleaning element 1 needs to be fed to the downstream side of the contact surface 1A by the feeding mechanism (described later) of the tool body 20.

FIG. 2B illustrates a state after the cleaning element 1 is carried to the head 60. By carrying the cleaning element 1 to the head 60, an unused portion of the cleaning element 1 is supplied from the upstream side of the contact surface 1A, and the used portion of the cleaning element 1 is fed to the downstream side of the contact surface 1A. In this manner, the contact surface 1A formed with an unused portion of the cleaning element 1 can be brought into contact with the ferrule endface 91.

Figure 2C:
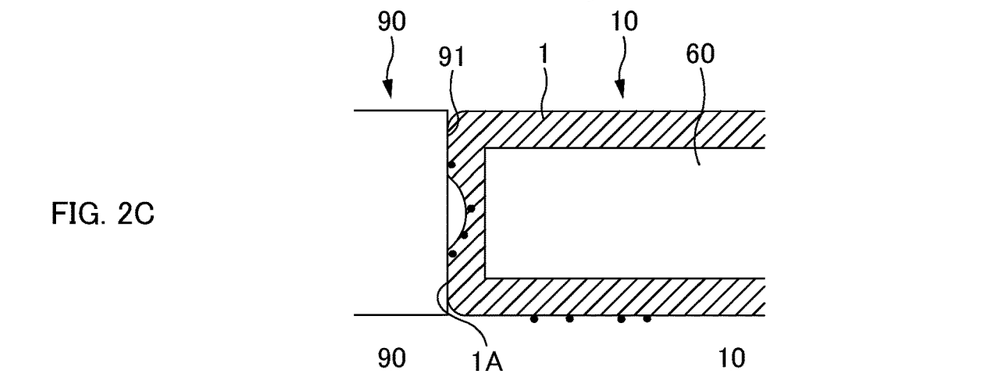
Figure 2D:
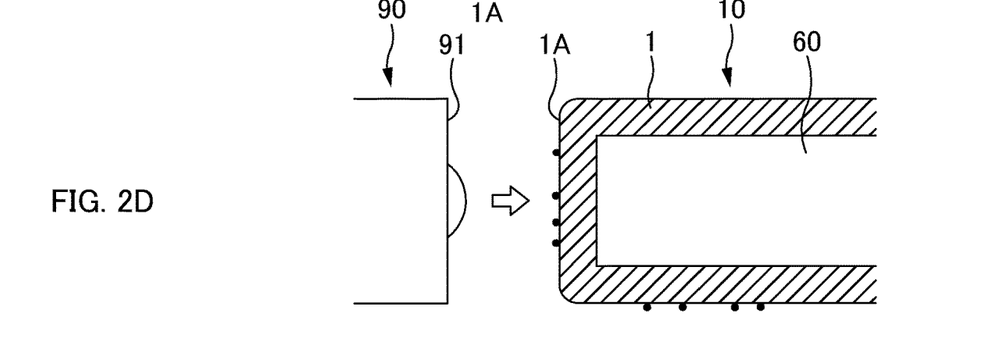

FIG. 2C illustrates a state in which the contact surface 1A is brought into contact with the ferrule endface 91. The foreign materials on the ferrule endface 91 are adsorbed onto the cleaning element 1 side owing to the self-adhesiveness of the cleaning element 1. Lastly, FIG. 2D illustrates a state in which the contact surface 1A is stripped off the ferrule endface 91. Owing to the self-adhesiveness of the cleaning element 1, the adhesive element forming the cleaning element 1 can be prevented from being conveyed to the ferrule endface 91. Further, the foreign materials on the ferrule endface 91 are adsorbed onto the contact surface 1A side.

In one or more embodiments, an operation (see FIG. 2B) of carrying the cleaning element 1 so as to supply an unused portion of the cleaning element 1 to the head 60 and feed a used portion of the cleaning element 1 from the head 60 is performed, and subsequently an operation (see FIG. 2C) of bringing the cleaning element 1 into contact with the ferrule endface 91 is performed. If the cleaning element 1 is carried in a state in which the cleaning element 1 is in contact with the ferrule endface 91, in some cases the cleaning element 1 cannot be smoothly carried due to the cleaning element 1 sticking to the ferrule endface 91. When the cleaning element 1 is carried with the foreign materials being borne on the cleaning element 1, the cleaning element 1 may receive a shear stress due to the foreign materials, and the adhesive element forming the cleaning element 1 may be torn into small pieces. Such torn and small pieces of the cleaning element 1 may adhere onto the ferrule endface 91 as remnants, which may be a cause of an increase of transmission losses.

For this reason, in one or more embodiments, after carrying of the cleaning element 1 to the head 60 is completed (see FIG. 2B), the cleaning element 1 is brought into contact with the ferrule endface 91 (see FIG. 2C). With this configuration, the cleaning element 1 can be smoothly carried, and at the same time, the adhesive element forming the cleaning element 1 can be prevented from being torn into small pieces.

Cleaning Operation

Figure 3A:
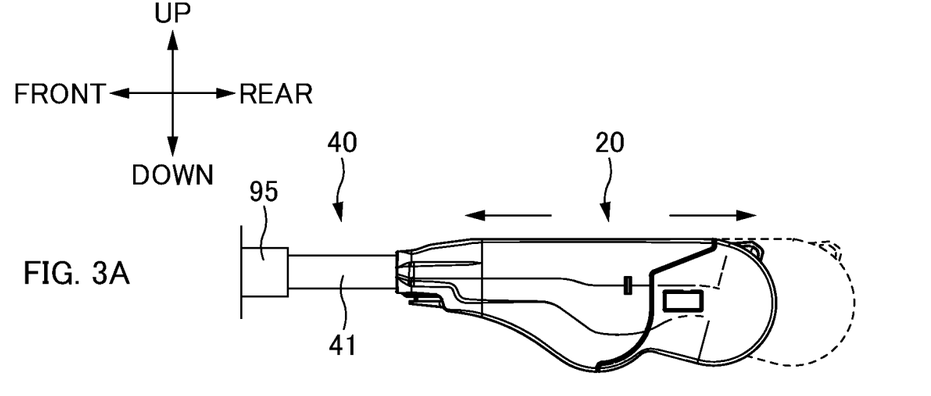
FIG. 3A is an explanatory diagram of a cleaning operation of the optical connector cleaning tool 10 (first embodiment).
Figure 3B:
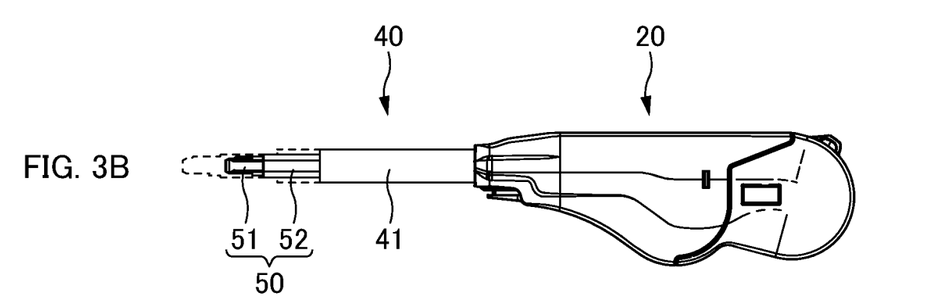
FIG. 3B is a side view of the optical connector cleaning tool 10 (first embodiment) in a normal state.
Figure 3C:
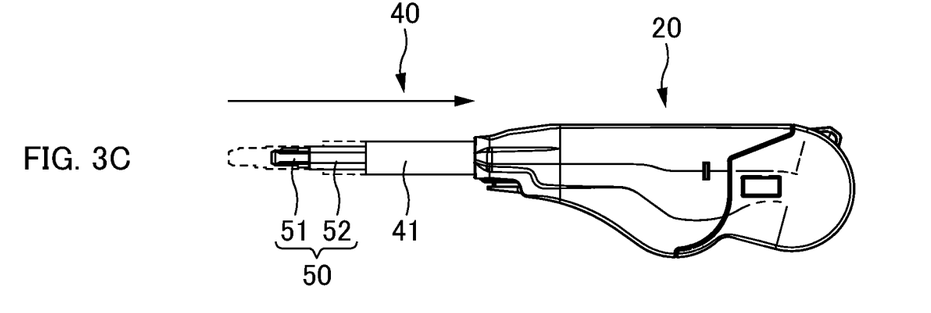
FIG. 3C is a side view of the optical connector cleaning tool 10 (first embodiment) in a carrying state.
Figure 3D:
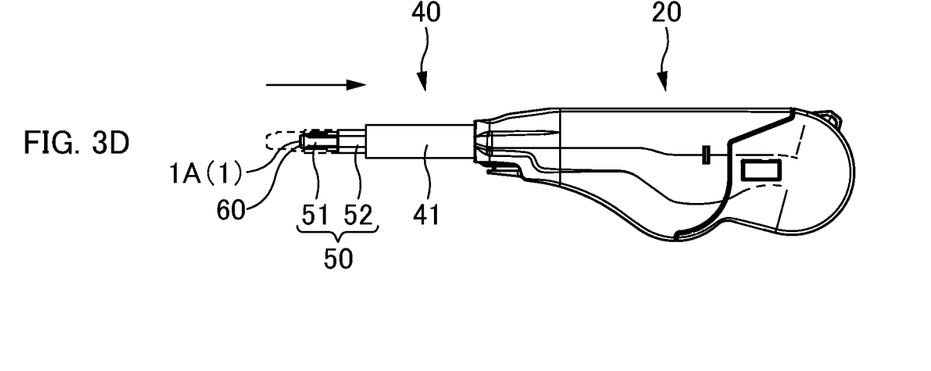
FIG. 3D is a side view of the optical connector cleaning tool 10 (first embodiment) in a contact state.

FIG. 3A is an explanatory diagram of a cleaning operation of the optical connector cleaning tool 10 (first embodiment). FIG. 3B is a side view of the optical connector cleaning tool 10 (first embodiment) in a normal state. FIG. 3C is a side view of the optical connector cleaning tool 10 (first embodiment) in a carrying state. FIG. 3D is a side view of the optical connector cleaning tool 10 (first embodiment) in a contact state.

As illustrated in FIG. 3A, in the cleaning operation using the cleaning tool 10 according to one or more embodiments, a tip end of the extension part 40 (the tip end portion 51 of the blocking part 50) is inserted into a connector housing hole of an optical adapter 95, and the cleaning element 1 extending across the head 60 is pressed onto the optical connector 90 (ferrule endface 91) in the optical adapter 95. As described above, in the cleaning tool 10 according to one or more embodiments, the extension part 40 is movable in the front-rear direction with respect to the tool body 20. In the actual cleaning operation, as illustrated in FIG. 3A, the tool body 20 moves in the front-rear direction with respect to the extension part 40. Note that, for the sake of simplicity of description of the structure and the operation of the cleaning tool 10, as illustrated in FIGS. 3B-3D, the extension part 40 may be moved in the front-rear direction with respect to the tool body 20 in description. In the following description, such movement between the tool body 20 and the extension part 40 may be referred to as "relative movement between the tool body 20 and the extension part 40".

In the cleaning tool 10 according to one or more embodiments, as illustrated in FIGS. 3B-3D to be described later, owing to the relative movement between the tool body 20 and the extension part 40, the operation (FIG. 2B described above) of carrying the cleaning element 1 to the head 60 and the operation (see FIG. 2C described above) of bringing the cleaning element 1 to be able to contact the ferrule endface 91 of the optical connector 90 after carrying the cleaning element 1 to the head 60 can be performed in series.

As illustrated in FIG. 3B, a state in which the extension part 40 is not moved in the rear direction with respect to the tool body 20 may be referred to as a "normal state". Note that a state in which the extension part 40 is restored to the original position by being moved to the front side with respect to the tool body 20 after the extension part 40 is moved in the rear direction with respect to the tool body 20 is also the "normal state". In the cleaning tool 10 in the normal state illustrated in FIG. 3B, a front endface (pressing surface) of the head 60 retracts toward the rear side with respect to the front endface of the blocking part 50 (tip end portion 51). From the perspective of the head 60, the endface of the blocking part 50 projects toward the front side (optical connector side 90 side) further than the endface of the head 60. Thus, the contact surface 1A of the cleaning element 1 extending across the head 60 is not exposed from the blocking part 50. Accordingly, in the cleaning tool 10 in the normal state, the state is one in which the blocking part 50 inhibits the cleaning element 1 from coming into contact with the ferrule endface 91 of the optical connector 90 even when the tip end portion 51 of the blocking part 50 is inserted into the connector housing hole of the optical adapter 95.

In one or more embodiments, owing to the relative movement between the tool body 20 and the extension part 40, the feeding mechanism (described later) is actuated, and the cleaning element 1 is carried to the head 60. In other words, when the extension part 40 is moved in the rear direction with respect to the tool body 20, an unused portion of the cleaning element 1 is supplied from the upstream side of the contact surface 1A, and a used portion of the cleaning element 1 is fed to the downstream side of the contact surface 1A (see FIGS. 2A-2D described above). Here, as illustrated in FIG. 3C, a state in which the extension part 40 is moved in the rear direction with respect to the tool body 20 may be referred to as a "carrying state". Note that, in the cleaning tool 10 in the carrying state, as illustrated in FIG. 3C, the entire extension part 40 is moved in the rear direction with respect to the tool body 20. Thus, a positional relationship between the blocking part 50 and the tube body 41 or the head 60 in the extension part 40 is not changed. Thus, the front endface (pressing surface) of the head 60 remains retracting toward the rear side with respect to the front endface of the blocking part 50 (tip end portion 51). From the perspective of the blocking part 50, the front endface of the blocking part 50 remains projecting toward the front side (optical connector side 90 side) further than the front endface of the head 60. Thus, the contact surface 1A of the cleaning element 1 extending across the head 60 is not exposed from the blocking part 50. Accordingly, in the cleaning tool 10 in the carrying state as well, the state is one in which the blocking part 50 inhibits the cleaning element 1 from coming into contact with the ferrule endface 91 of the optical connector 90.

In one or more embodiments, in the stage where the extension part 40 has moved in the rear direction with respect to the tool body 20 by a predetermined amount, the feeding mechanism (described later) completes carrying the cleaning element 1 to the head 60. When the extension part 40 is further moved in the rear direction with respect to the tool body 20, the blocking part 50 of the extension part 40 is moved in the rear direction with respect to the tube body 41, and the cleaning element 1 enters a state in which the cleaning element 1 is enabled to come into contact with the ferrule endface. From the perspective of the head 60, when the blocking part 50 retracts with respect to the head 60 and the endface of the head 60 is exposed to the front side (optical connector side 90 side), the cleaning element 1 is enabled to come into contact with the ferrule endface 91 of the optical connector 90. For this reason, a state in which the blocking part 50 of the extension part 40 is moved in the rear direction with respect to the tube body 41 as illustrated in FIG. 3D may be referred to as a "contact state". In the cleaning tool 10 in the contact state, the state in which the blocking part 50 inhibits the cleaning element 1 from coming into contact with the ferrule endface 91 of the optical connector 90 is released, and the cleaning element 1 is enabled to come into contact with the ferrule endface 91 of the optical connector 90. Note that, in the cleaning tool 10 in the contact state, the cleaning element 1 is pressed onto the ferrule endface 91 with the head 60 (see FIG. 2C described above).

In a series of cleaning operations illustrated in FIGS. 3B-3D, an operator moves the tool body 20 toward the optical connector 90 side (push operation). With this operation, the cleaning tool 10 shifts from the normal state of FIG. 3B to the carrying state of FIG. 3C. After the carrying state, the operator further moves the tool body 20 toward the optical connector 90 side (push operation). With this operation, the cleaning tool 10 shifts from the carrying state of FIG. 3C to the contact state of FIG. 3D. Further, after pressing the contact surface 1A of the cleaning element 1 onto the ferrule endface 91, the operator moves the tool body 20 toward the rear side in order to strip the contact surface 1A of the cleaning element 1 off the ferrule endface 91 and take out the cleaning tool 10 (pull operation). With this operation, the cleaning tool 10 is restored from the contact state of FIG. 3D to the normal state of FIG. 3B.

As described above, the operator performs the push operation and the pull operation during a single cleaning operation. In the push operation, the tool body 20 is moved toward the front side with respect to the extension part 40 (from the perspective of the tool body 20 side, the extension part 40 is moved in a manner of approaching the tool body 20). In the pull operation, the tool body 20 is moved toward the rear side with respect to the extension part 40, from the perspective of the tool body 20 side, the extension part 40 is moved in a manner of separating away from the tool body 20). In this manner, owing to the push operation and the pull operation performed by the operator, the tool body 20 and the extension part 40 make a relative movement in the front-rear direction. In the cleaning tool 10 according to one or more embodiments, carrying of the cleaning element 1 and bringing of the cleaning element 1 into contact with the ferrule endface 91 after the carrying of the cleaning element 1 are performed by using the relative movement between the tool body 20 and the extension part 40. In other words, in a single operation of the relative movement between the tool body 20 and the extension part 40, carrying of the cleaning element 1 to the head 60 and bringing of the cleaning element 1 into contact with the ferrule endface 91 after the carrying of the cleaning element 1 to the head 60 can be performed. With this configuration, the cleaning operation can be efficiently performed when the optical connector is cleaned by using the cleaning element formed with the tape-like adhesive element.

Figure 4:
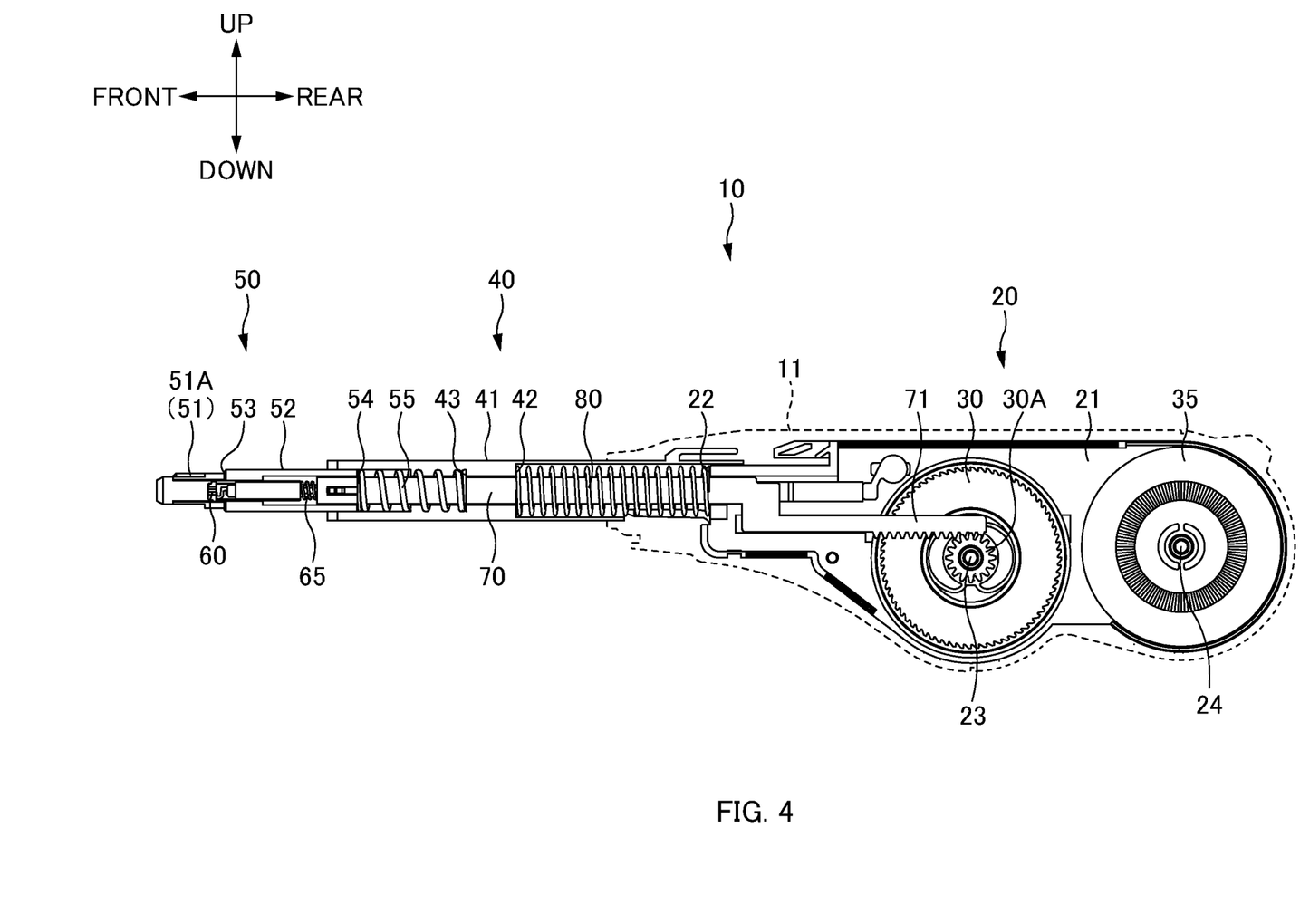
FIG. 4 is a diagram illustrating the inside of the optical connector cleaning tool 10 (first embodiment) in the normal state.

Detailed Configuration Inside Optical Connector Cleaning Tool:

FIG. 4 is a diagram illustrating the inside of the optical connector cleaning tool 10 (first embodiment) in the normal state.

As illustrated in FIG. 4, the cleaning tool 10 according to one or more embodiments further includes a spring 80 for the extension part, in addition to the cover 11, the tool body 20, and the extension part 40. The spring 80 for the extension part is an elastic member for restoring a positional relationship between the tool body 20 and the extension part 40. The spring 80 for the extension part is disposed between the tool body 20 and the extension part 40. Specifically, a front end portion of the spring 80 for the extension part is retained by a spring receiving part 42 for the extension part that is provided in the tube body 41 of the extension part 40, and a rear end portion of the spring 80 for the extension part is retained by a spring receiving part 22 for the extension part that is provided in a housing 21 (described later) of the tool body 20. When the extension part 40 is moved toward the rear side with respect to the tool body 20 at the time of cleaning of the optical connector, the spring 80 for the extension part is compressed and deformed. When the compressed and deformed spring 80 for the extension part is restored, the extension part 40 is restored to the original position by being moved toward the front side with respect to the tool body 20. Owing to the configuration in which the cleaning tool 10 further includes the spring 80 for the extension part, the extension part 40 can be easily restored to the original position after the extension part 40 is moved with respect to the tool body 20.

As illustrated in FIG. 4, in the cleaning tool 10 according to one or more embodiments, the tool body 20 includes a housing 21, a take-up reel 30, and a supply reel 35.

The housing 21 is a member that houses the take-up reel 30 and the supply reel 35. The housing 21 is a member that retains a rear-side part of a head support part 70 (described later) of the extension part 40 in which a rack 71 is formed, so as to be movable in the front-rear direction. The housing 21 is also a member that retains the tube body 41 so as to be movable in the front-rear direction. In the housing 21, the spring receiving part 22 for the extension part is provided. The spring receiving part 22 for the extension part is provided on the front side of the housing 21, and comes into contact with one end (rear end portion) of the spring 80 for the extension part. Further, in the housing 21, a take-up reel support shaft 23 that rotatably supports the take-up reel 30 and a supply reel support shaft 24 that rotatably supports the supply reel 35 are provided. In the housing 21, the take-up reel support shaft 23 and the supply reel support shaft 24 are provided in a layout in which the take-up reel support shaft 23 is provided on the front side and the supply reel support shaft 24 is provided on the rear side. However, the take-up reel support shaft 23 may be provided on the rear side and the supply reel support shaft 24 may be provided on the front side. The take-up reel support shaft 23 and the supply reel support shaft 24 may be provided in another layout.

The take-up reel 30 is a reel that takes up and collects a used portion of the cleaning element 1. Note that the take-up reel 30 is equipped with a pinion 30A that conveys rotating motion to the take-up reel 30. The pinion 30A is a circular gear that constitutes a rack-and-pinion mechanism together with a rack 71 (described later) that is provided in the head support part 70 of the extension part 40. When the rack 71 is relatively moved in the front-rear direction with respect to the pinion 30A, the pinion 30A receives a rotation force due to the rack 71, with the result that the take-up reel 30 equipped with the pinion 30A is also rotated. The supply reel 35 is a reel that supplies an unused portion of the cleaning element 1, the unused portion of the cleaning element 1 is wound around the supply reel 35.

As illustrated in FIG. 4, in the cleaning tool 10 according to one or more embodiments, the extension part 40 further includes a spring 55 for the blocking part, a spring 65 for the head, and a head support part 70.

The spring 55 for the blocking part is an elastic member for restoring a positional relationship between the tube body 41 and the blocking part 50 in the extension part 40. The spring 55 for the blocking part is disposed between the tube body 41 and the blocking part 50. Specifically, a front end portion of the spring 55 for the blocking part is retained by a spring receiving part 54 for the blocking part that is provided in the trunk part 52 of the blocking part 50, and a rear end portion of the spring 55 for the blocking part is retained by a spring receiving part 43 for the blocking part that is provided in the tube body 41 of the extension part 40. When the blocking part 50 is moved toward the rear side with respect to the tube body 41 at the time of cleaning of the optical connector, the spring 55 for the blocking part is compressed and deformed. When the compressed and deformed spring 55 for the blocking part is restored, the blocking part 50 is restored to the original position by being moved to the front side with respect to the tube body 41. Owing to the configuration in which the cleaning tool 10 further includes the spring 55 for the blocking part, the blocking part 50 can be easily restored to the original position after the blocking part 50 is moved with respect to the tube body 41.

The spring 65 for the head is an elastic member for pressing the head 60 toward the front side. The spring 65 for the head is disposed between the head 60 and the head support part 70. When the spring 65 for the head is elastically deformed at the time of cleaning of the optical connector, the cleaning element 1 extending across the head 60 can be pressed onto the optical connector with a predetermined pressing pressure. Note that the extension part 40 need not include the spring 65 for the head.

The head support part 70 is a part that supports the head 60 so that the head 60 can retract when the head 60 presses the cleaning element 1 onto the optical connector. On the front side of the head support part 70, the head 60 is connected so as to be movable in the front-rear direction. As described above, a rear-side part of the head support part 70 is retained so as to be movable in the front-rear direction with respect to the housing 21. Further, the head support part 70 is provided so as to extend toward the front side from the housing 21. The head support part 70 is housed inside the tube body 41 and the blocking part 50. Note that, when the spring 65 for the head described above is not provided, the head support part 70 may be integrally formed with the head 60. Note that the rack 71 is provided on the rear side of the head support part 70. The rack 71 is a part that constitutes the rack-and-pinion mechanism together with the pinion 30A of the tool body 20. When the rack 71 is relatively moved in the front-rear direction with respect to the pinion 30A, a rotation force acts on the pinion 30A about the take-up reel support shaft 23.

The rack-and-pinion mechanism constituting the rack 71 provided on the rear side of the head support part 70 and the pinion 30A attached to the take-up reel 30, the take-up reel 30, and the supply reel 35 constitute a feeding mechanism. The feeding mechanism supplies an unused portion of the cleaning element 1 from the upstream side of the contact surface 1A and feeds an used portion of the cleaning element 1 to the downstream side of the contact surface 1A by using the relative movement between the tool body 20 and the extension part 40 in the front-rear direction at the time of cleaning. Note that the feeding mechanism may carry the cleaning element 1 to the head 60 by using another method.

Figure 5A:
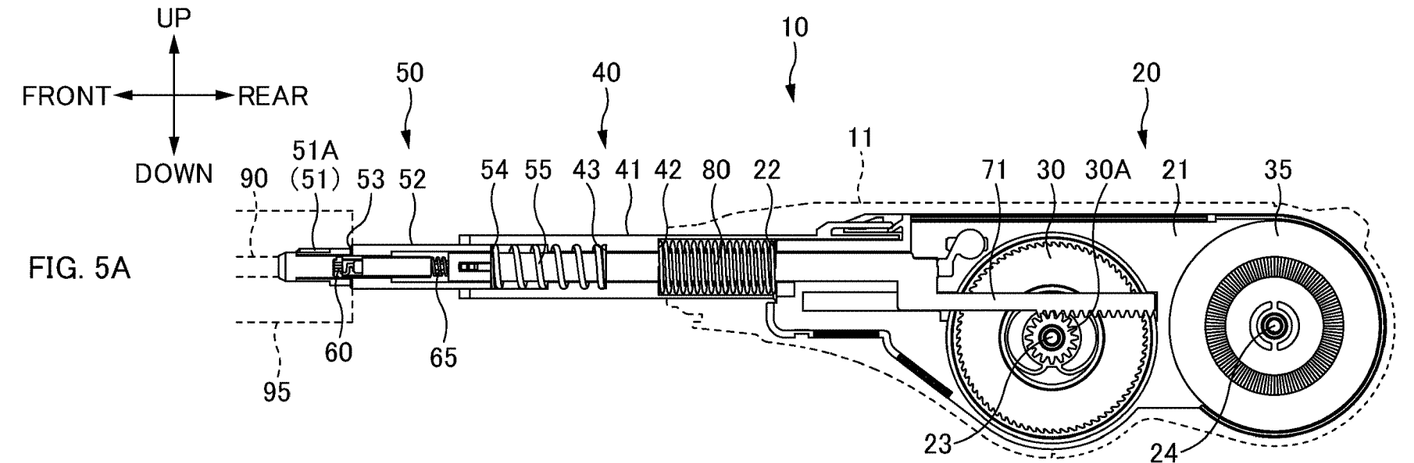
FIG. 5A is a diagram illustrating the inside of the optical connector cleaning tool 10 (first embodiment) in the carrying state.
Figure 5B:
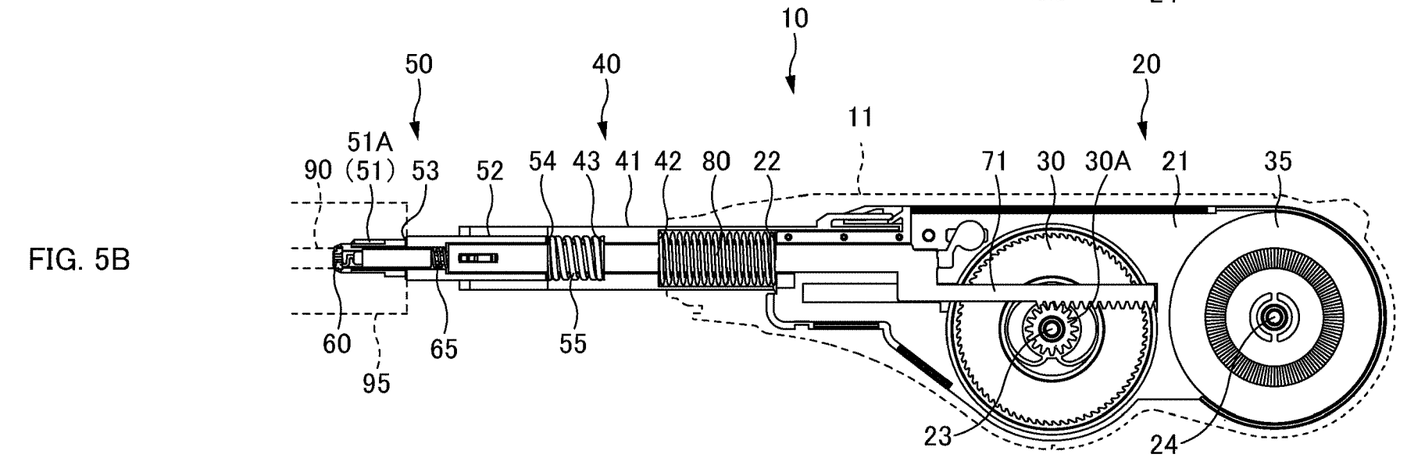
FIG. 5B is a diagram illustrating the inside of the optical connector cleaning tool 10 (first embodiment) in the contact state.

Operation Inside Optical Connector Cleaning Tool at Time of Cleaning of Optical Connector:

FIG. 5A is a diagram illustrating the inside of the optical connector cleaning tool 10 (first embodiment) in the carrying state. FIG. 5B is a diagram illustrating the inside of the optical connector cleaning tool 10 (first embodiment) in the contact state.

In the cleaning tool 10 in the normal state illustrated in FIG. 4 described above, the blocking part 50 front endface projects toward the front side (optical connector side 90 side) further than the front endface of the head 60. Thus, the contact surface 1A of the cleaning element 1 extending across the head 60 is not exposed from the blocking part 50. Accordingly, in the cleaning tool 10 in the normal state, the state is one in which the blocking part 50 inhibits the cleaning element 1 from coming into contact with the ferrule endface 91 of the optical connector 90 even when the tip end portion 51 of the blocking part 50 is inserted into the connector housing hole of the optical adapter 95.

When the operator cleans the optical connector 90 by using the cleaning tool 10 according to one or more embodiments, first, the operator holds the tool body 20 with the cover 11, and inserts the blocking part 50 (tip end portion 51) of the extension part 40 into the connector housing hole of the optical adapter 95 to which the optical connector 90 is connected. In this case, the key 51A formed in the tip end portion 51 is inserted into the keyway that is formed inside the optical adapter 95. With this configuration, the cleaning element 1 can be accurately placed to face the ferrule endface 91 of the optical connector 90.

When the operator further moves the cleaning tool 10 toward the optical connector 90 side after the blocking part 50 (tip end portion 51) is inserted into the connector housing hole of the optical adapter 95, the blocking part 50 (shoulder part 53) being inserted into the connector housing hole of the optical adapter 95 comes into abutment against the rim of the connector housing hole of the optical adapter 95. Note that, instead of the configuration in which the shoulder part 53 comes into abutment against the rim of the connector housing hole of the optical adapter 95, the tip end portion 51 of the blocking part 50 may come into abutment against the back of the connector housing hole of the optical adapter 95. In this state, when the operator further moves the cleaning tool 10 toward the optical connector 90 side, the blocking part 50 receives a force in the rear direction due to the optical adapter 95 against which the blocking part 50 comes into abutment. Note that, when the blocking part 50 receives the force in the rear direction, not only does the spring 55 for the blocking part receive a force in a compression direction but the spring 80 for the extension part also receives the force as well through the tube body 41.

Here, in one or more embodiments, the spring 55 for the blocking part is formed to be more resistive than the spring 80 for the extension part when receiving the force in the compression direction. In other words, the spring 80 for the extension part is formed to be more easily compressed than the spring 55 for the blocking part. For this reason, as illustrated in FIG. 5A, when the blocking part 50 receives a force in the rear direction (the compression direction of the spring 55 for the blocking part and the spring 80 for the extension part), the spring 80 for the extension part is compressed to a greater extent. In this manner, when the entire extension part 40 is moved in the rear direction with respect to the tool body 20, the head support part 70 provided with the rack 71 is also moved in the rear direction (with respect to the pinion 30A). In this case, owing to the rack-and-pinion mechanism described above, the relative movement (linear motion) of the extension part 40 with respect to the tool body 20 is converted into a rotating motion of the take-up reel 30 in a take-up direction through the pinion 30A. In this manner, the take-up reel 30 is rotated, and the cleaning element 1 is taken up by the take-up reel 30. A portion of the cleaning element 1 as long as the distance of the cleaning element 1 taken up by the take-up reel 30 is supplied from the supply reel 35. In other words, owing to the feeding mechanism configured by the rack-and-pinion mechanism, an unused portion of the cleaning element 1 is supplied from the upstream side of the contact surface 1A, and a used portion of the cleaning element 1 is fed to the downstream side of the contact surface 1A. In other words, the cleaning tool 10 enters such a carrying state that the feeding mechanism is actuated and the cleaning element 1 is carried to the head 60 owing to the relative movement between the tool body 20 and the extension part 40, as illustrated in FIG. 3C described above.

In other words, owing to the configuration in which the spring 80 for the extension part is formed so as to be more easily compressed than the spring 55 for the blocking part, the entire extension part 40 is moved in the rear direction with respect to the tool body 20 before the blocking part 50 of the extension part 40 is moved in the rear direction with respect to the tube body 41. Thus, the cleaning element 1 is carried to the head 60 while the blocking part 50 inhibits the cleaning element 1 from coming into contact with the ferrule endface 91 of the optical connector 90.

In one or more embodiments, in the stage where the extension part 40 is moved in the rear direction with respect to the tool body 20 by a predetermined amount, the feeding mechanism of the tool body 20 completes carrying the cleaning element 1 to the head 60. Specifically, when the tube body 41 retained movably in the rear direction with respect to the housing 21 is moved until the tube body 41 comes into abutment against the housing 21, movement of the rack 71 with respect to the pinion 30A is restricted, and the feeding mechanism of the tool body 20 thereby completes carrying the cleaning element 1 to the head 60. When the spring 80 for the extension part is compressed to its fully loaded length to become unable to be compressed any further, the movement of the rack 71 with respect to the pinion 30A is restricted, and the feeding mechanism of the tool body 20 thereby completes carrying the cleaning element 1 to the head 60. Through these operations, a movement amount of the extension part 40 with respect to the tool body 20 reaches a predetermined amount, and the feeding mechanism of the tool body 20 thereby completes carrying the cleaning element 1 to the head 60. After the carrying is completed, the cleaning element 1 is not carried to the head 60 even if the extension part 40 is moved with respect to the tool body 20, and in addition, after the carrying is completed, the spring 80 for the extension part is not compressed any further.

Note that, in the cleaning tool 10 in the carrying state illustrated in FIG. 5A, as illustrated in FIG. 3C described above, the movement of the entire extension part 40 in the rear direction with respect to the tool body 20 does not make a difference in the positional relationship between the blocking part 50 and the tube body 41 or the head 60 in the extension part 40. Thus, the front endface (pressing surface) of the head 60 remains retracted toward the rear side with respect to the front endface of the blocking part 50 (tip end portion 51). From the perspective of the blocking part 50, the front endface of the blocking part 50 remains projecting toward the front side (optical connector side 90 side) further than the front endface of the head 60. Thus, the contact surface 1A of the cleaning element 1 extending across the head 60 is not exposed from the blocking part 50. Accordingly, in the cleaning tool 10 in the carrying state as well, the state is one in which the blocking part 50 inhibits the cleaning element 1 from coming into contact with the ferrule endface 91 of the optical connector 90.

When the cleaning tool 10 is further moved toward the optical connector 90 side from the carrying state illustrated in FIG. 5A described above, the blocking part 50 receives a force in the rear direction, and the spring 55 for the blocking part thereby receives a force in the compression direction. In this case, when the spring 55 for the blocking part is compressed, the blocking part 50 of the extension part 40 is moved in the rear direction with respect to the tube body 41. From the perspective of the head 60, the front endface of the head 60 projects toward the front side (optical connector side 90 side) further than the front endface of the blocking part 50. In this manner, the front endface of the head 60 projects out of the front endface of the blocking part 50. Thus, the contact surface 1A of the cleaning element 1 is exposed from the blocking part 50. In other words, the cleaning tool 10 enters such a contact state that the state in which the blocking part 50 inhibits the cleaning element 1 from coming into contact with the ferrule endface 91 of the optical connector 90 is released and the cleaning element 1 is enabled to come into contact with the ferrule endface 91 of the optical connector 90, as illustrated in FIG. 3D described above.

As described above, when the cleaning tool 10 is moved toward the optical connector 90 side from the normal state illustrated in FIG. 4, the state enters the carrying state illustrated in FIG. 5A. Further, when the cleaning tool 10 is further moved toward the optical connector 90 side from the carrying state illustrated in FIG. 5A, the state enters the contact state illustrated in FIG. 5B. In the cleaning tool 10 according to one or more embodiments, the blocking part 50 receives a force in the rear direction due to the optical adapter 95 against which the blocking part 50 comes into abutment, from when the state shifts from the normal state to the carrying state and further shifts to the contact state. From the normal state to the carrying state, both of the spring 55 for the blocking part and the spring 80 for the extension part receive a compression force. However, at the time when carrying of the cleaning element 1 to the head 60 is completed, compression of the spring 80 for the extension part is also completed. For this reason, from the time when carrying of the cleaning element 1 to the head 60 is completed to when the state is shifted to the contact state, only the spring 55 for the blocking part continues to receive the compression force. Accordingly, a load on the spring 80 for the extension part at the time when carrying of the cleaning element 1 to the head 60 is completed is smaller than a load on the spring 55 for the blocking part at the time when the cleaning element 1 is enabled to come into contact with the optical connector 90.

Second Embodiment

Figure 6A:
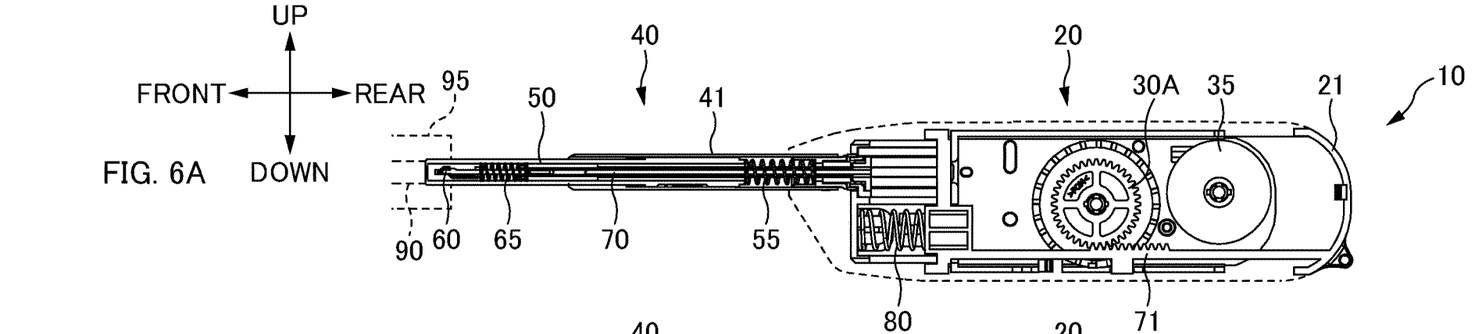
FIG. 6A is a diagram illustrating the inside of an optical connector cleaning tool 10 (second embodiment) in the normal state.
Figure 6B:
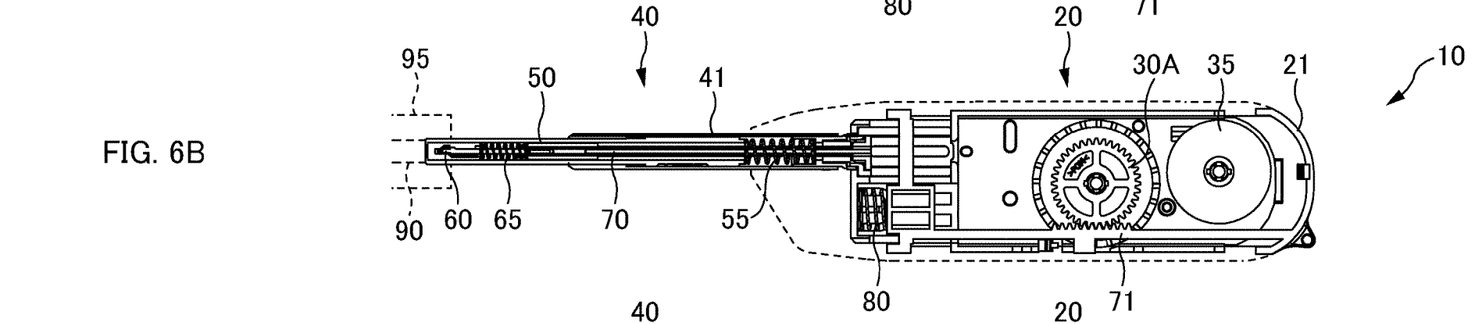
FIG. 6B is a diagram illustrating the inside of the optical connector cleaning tool 10 (second embodiment) in the carrying state.
Figure 6C:
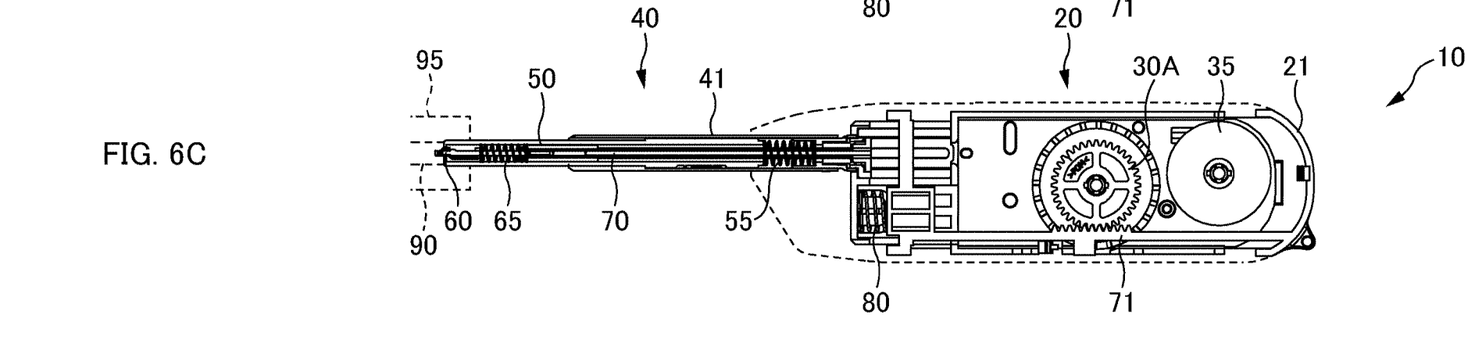
FIG. 6C is a diagram illustrating the inside of the optical connector cleaning tool 10 (second embodiment) in the contact state.

FIG. 6A is a diagram illustrating the inside of the optical connector cleaning tool 10 (second embodiment) in the normal state. FIG. 6B is a diagram illustrating the inside of the optical connector cleaning tool 10 (second embodiment) in the carrying state. FIG. 6C is a diagram illustrating the inside of the optical connector cleaning tool 10 (second embodiment) in the contact state.

In the cleaning tool 10 according to the second embodiment illustrated in FIGS. 6A-6C, the rack 71 is attached to the housing 21, and when the pinion 30A attached to the take-up reel 30, the take-up reel 30, and the supply reel 35 are moved in the front-rear direction, relative movement (linear motion) of the extension part 40 with respect to the tool body 20 is converted into a rotating motion of the take-up reel 30 in the take-up direction through the pinion 30A. Note that, in the cleaning tool 10 according to the second embodiment as well, in a single operation of the relative movement between the tool body 20 and the extension part 40, carrying of the cleaning element 1 to the head 60 and bringing of the cleaning element 1 into contact with the ferrule endface 91 after the carrying of the cleaning element 1 to the head 60 can be performed. With this configuration, the cleaning operation can be efficiently performed when the optical connector is cleaned by using the cleaning element formed with the tape-like adhesive element.

Thus, in the optical connector cleaning tool 10 according to the second embodiment as well, owing to the relative movement between the tool body 20 and the extension part 40, the cleaning element 1 is carried to the head 60 (see FIG. 6B), and the cleaning element 1 is enabled to come into contact with the optical connector 90 after the cleaning element 1 is carried to the head 60 (see FIG. 6C). With this configuration, in the second embodiment as well, the cleaning operation can be efficiently performed when the optical connector 90 is cleaned by using the cleaning element 1 formed with the tape-like adhesive element. In the optical connector cleaning tool 10 according to the second embodiment as well, the blocking part 50 inhibits the cleaning element 1 from coming into contact with the optical connector 90 while the cleaning element 1 is carried to the head 60 (see FIG. 6B), and after the cleaning element 1 is carried to the head 60, the inhibition of the blocking part 50 is released, and the cleaning element 1 is enabled to come into contact with the optical connector 90 (see FIG. 6C). With this configuration, in the embodiments described above, the cleaning element 1 can be prevented from being carried to the head 60 while the cleaning element 1 remains in contact with the optical connector 90.

Other Embodiments

In the optical connector cleaning tool 10 according to the embodiments described above, as illustrated in FIGS. 3A-3D and FIGS. 5A-5B, the endface of the head 60 is exposed to the optical connector 90 side when the blocking part 50 retracts with respect to the head 60 after the cleaning element 1 is carried to the head 60 (see FIG. 3D and FIG. 5B). However, the endface of the head 60 may be exposed to the optical connector 90 side when the head 60 is moved forward with respect to the blocking part 50 after the cleaning element 1 is carried to the head 60. With this configuration, in a single operation of the relative movement between the blocking part 50 and the head 60, the cleaning element 1 is enabled to come into contact with the optical connector 90.

An optical connector cleaning tool 10 according to the embodiments described above is, as illustrated in FIGS. 2A-2D and FIGS. 3A-3D, an optical connector cleaning tool including: a tool body 20; and an extension part 40 being provided relatively movably with respect to the tool body 20 and extending out of the tool body 20. Further, in the embodiments described above, the extension part 40 includes a head 60 configured to press a cleaning element 1 formed with a tape-like adhesive element onto an optical connector 90, and the relative movement between the tool body 20 and the extension part 40 is used to carry the cleaning element 1 to the head 60 (see FIG. 2B and FIG. 3C), and to enable the cleaning element 1 to come into contact with the optical connector 90 after the cleaning element 1 is carried to the head 60 (see FIG. 2C and FIG. 3D). With this configuration, in the embodiments described above, the cleaning operation can be efficiently performed when the optical connector 90 is cleaned by using the cleaning element 1 formed with the tape-like adhesive element.

In the optical connector cleaning tool 10 according to the embodiments described above, as illustrated in FIGS. 2A-2D and FIGS. 3A-3D, the extension part 40 includes a blocking part 50, the blocking part 50 inhibits the cleaning element 1 from coming into contact with the optical connector 90 while the cleaning element 1 is carried to the head 60 (see FIG. 2B and FIG. 3C), and after the cleaning element 1 is carried to the head 60, the inhibition of the blocking part 50 is released, and the cleaning element 1 is enabled to come into contact with the optical connector 90 (see FIG. 2C and FIG. 3D). With this configuration, in the embodiments described above, the cleaning element 1 can be prevented from being carried to the head 60 while the cleaning element 1 remains in contact with the optical connector 90.

In the optical connector cleaning tool 10 according to the embodiments described above, as illustrated in FIGS. 3A-3D, FIGS. 5A-5B, and FIGS. 6A-6C, the blocking part 50 and the head 60 are capable of relative movement, and the relative movement between the blocking part 50 and the head 60 is used to shift a state from a state in which the blocking part 50 inhibits the cleaning element 1 from coming into contact with the optical connector 90 (see FIG. 3C, FIG. 5A, and FIG. 6B) to a state in which the inhibition of the blocking part 50 is released and the cleaning element 1 is enabled to come into contact with the optical connector 90 (see FIG. 3D, FIG. 5B, and FIG. 6C). With this configuration, in the embodiments described above, in a single operation of the relative movement between the blocking part 50 and the head 60, the state in which the blocking part 50 inhibits the cleaning element 1 from coming into contact with the optical connector 90 can be released.

In the optical connector cleaning tool 10 according to the embodiments described above, as illustrated in FIGS. 3A-3D, FIGS. 5A-5B, and FIGS. 6A-6C, an endface of the blocking part 50 projects toward a side of the optical connector 90 further than an endface of the head 60 while the cleaning element 1 is carried to the head 60 (see FIG. 3C, FIG. 5A, and FIG. 6B). With this configuration, in the embodiments described above, the cleaning element 1 can be prevented from being carried to the head 60 while the cleaning element 1 remains in contact with the optical connector 90.

In the optical connector cleaning tool 10 according to the embodiments described above, as illustrated in FIGS. 3A-3D, FIGS. 5A-5B, and FIGS. 6A-6C, the endface of the head 60 is exposed to a side of the optical connector 90 when a positional relationship between the blocking part 50 and the head 60 is changed after the cleaning element 1 is carried to the head 60 (see FIG. 3D, FIG. 5B, and FIG. 6C). With this configuration, in the embodiments described above, in a single operation of the relative movement between the blocking part 50 and the head 60, the cleaning element 1 is enabled to come into contact with the optical connector 90.

In the optical connector cleaning tool 10 according to the embodiments described above, as illustrated in FIGS. 3A-3D, FIGS. 5A-5B, and FIGS. 6A-6C, the endface of the head 60 is exposed to a side of the optical connector 90 when the blocking part 50 retracts with respect to the head 60 after the cleaning element 1 is carried to the head 60 (see FIG. 3D, FIG. 5B, and FIG. 6C). With this configuration, in the embodiments described above, in a single operation of the relative movement between the blocking part 50 and the head 60, the cleaning element 1 is enabled to come into contact with the optical connector 90.

In the optical connector cleaning tool 10 according to the embodiments described above, the endface of the head 60 is exposed to a side of the optical connector 90 when the head 60 is moved forward with respect to the blocking part 50 after the cleaning element 1 is carried to the head 60. With this configuration, in the embodiments described above, in a single operation of the relative movement between the blocking part 50 and the head 60, the cleaning element 1 is enabled to come into contact with the optical connector 90.

The optical connector cleaning tool 10 according to the embodiments described above further includes, as illustrated in FIG. 4 and FIGS. 6A-6C, a spring 80 for the extension part (first spring) being provided between the tool body 20 and the extension part 40, and being configured to restore a positional relationship between the tool body 20 and the extension part 40, and a spring 55 for the blocking part (second spring) being provided on a side opposite to the optical connector 90 with respect to the blocking part 50, and being configured to restore a positional relationship between the blocking part 50 and the head 60. With this configuration, in the embodiments described above, the positional relationship between the tool body 20 and the extension part 40 and the positional relationship between the blocking part 50 and the head 60 can be easily restored.

In the optical connector cleaning tool 10 according to the embodiments described above, a load on the spring 80 for the extension part (first spring) at a time when the carrying of the cleaning element 1 to the head 60 is completed is smaller than a load on the spring 55 for the blocking part (second spring) at a time when the cleaning element 1 is enabled to come into contact with the optical connector 90. With this configuration, in the embodiments described above, in a single operation of the relative movement between the tool body 20 and the extension part 40, the state in which the blocking part 50 inhibits the cleaning element 1 from coming into contact with the optical connector 90 can be released.

An optical connector cleaning tool 10 according to the embodiments described above is, as illustrated in FIGS. 2A-2D and FIGS. 3A-3D, a method of cleaning an optical connector by using an optical connector cleaning tool including a tool body 20, and an extension part 40 being provided relatively movably with respect to the tool body 20 and extending out of the tool body 20. Further, in the embodiments described above, the extension part 40 includes a head 60 that presses a cleaning element 1 formed with a tape-like adhesive element onto the optical connector 90. The method includes using the relative movement between the tool body 20 and the extension part 40 to carry the cleaning element 1 to the head 60 (see FIG. 2B and FIG. 3C), and to enable the cleaning element 1 to come into contact with the optical connector 90 after the cleaning element 1 is carried to the head 60 (see FIG. 2C and FIG.

3D). With this configuration, in the embodiments described above, the cleaning operation can be efficiently performed when the optical connector 90 is cleaned by using the cleaning element 1 formed with the tape-like adhesive element.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Cleaning element;
1A: Contact surface;
10: Optical connector cleaning tool;
11: Cover;
11A: Front cover;
11B: Rear cover;
20: Tool body;
21: Housing;
22: Spring receiving part for extension part;
23: Take-up reel support shaft;
24: Supply reel support shaft;
30: Take-up reel (feeding mechanism);
30A: Pinion (feeding mechanism) (rack-and-pinion mechanism);
35: Supply reel (feeding mechanism);
40: Extension part;
41: Tube body;
42: Spring receiving part for extension part;
43: Spring receiving part for blocking part;
50: Blocking part;
51: Tip end portion;
51A: Key;
52: Trunk part;
53: Shoulder part;
54: Spring receiving part for blocking part;
55: Spring for blocking part;
60: Head;
65: Spring for head;
70: Head support part;
71: Rack (feeding mechanism) (rack-and-pinion mechanism);
80: Spring for extension part;
90: Optical connector;
91: Ferrule endface;
95: Optical adapter.

The invention claimed is:

1. An optical connector cleaning tool for cleaning an optical connector, comprising:
a cleaning element comprising a tape-like adhesive element;
a tool body; and
an extension
comprising a head that presses the cleaning element onto the optical connector, wherein
by moving relatively with respect to the tool body, the extension carries the cleaning element to the head, and then stays out of the tool body to cause the cleaning element to contact the optical connector while the cleaning element is fixed with respect to the head.

2. The optical connector cleaning tool according to claim 1, wherein
the extension further comprises a blocking part,
while the cleaning element is carried to the head, the blocking part prevents the cleaning element from contacting the optical connector, and
after the cleaning element is carried to the head, the blocking part is released and the cleaning element is enabled to contact the optical connector.

3. The optical connector cleaning tool according to claim 2, wherein
the blocking part moves relative to the head, and
by moving relatively with respect to the head, the blocking part shifts a state of the optical connector cleaning tool from a state in which the blocking part prevents the cleaning element from contacting the optical connector to a state in which the blocking part is released and the cleaning element is enabled to contact the optical connector.

4. The optical connector cleaning tool according to claim 3, wherein, when the cleaning element is carried to the head, an endface of the blocking part projects toward the optical connector farther than an endface of the head.

5. The optical connector cleaning tool according to claim 4, wherein, after the cleaning element is carried to the head, the endface of the head is exposed to the optical connector when a positional relationship between the blocking part and the head is changed.

6. The optical connector cleaning tool according to claim 5, wherein, after the cleaning element is carried to the head, the endface of the head is exposed to the optical connector when the blocking part retracts with respect to the head.

7. The optical connector cleaning tool according to claim 5, wherein, after the cleaning element is carried to the head, the endface of the head is exposed to the optical connector when the head is moved forward with respect to the blocking part.

8. The optical connector cleaning tool according to claim 5, further comprising:
a first spring between the tool body and the extension, wherein the first spring restores a positional relationship between the tool body and the extension; and
a second spring on a side opposite to the optical connector with respect to the blocking part, wherein the second spring restores the positional relationship between the blocking part and the head.

9. The optical connector cleaning tool according to claim 8, wherein a load on the first spring at a time when the cleaning element to the head has been carried to the head is smaller than a load on the second spring at a time when the cleaning element is enabled to contact the optical connector.

10. A method of cleaning an optical connector by using an optical connector cleaning tool comprising a cleaning element comprising a tape-like adhesive element, a tool body, and an extension that moves relative with respect to the tool body and extends out of the tool body, wherein the extension comprises a head that presses the cleaning element onto the optical connector, the method comprising:
carrying the cleaning element to the head by moving the extension relatively with respect to the tool body; and
contacting the optical connector with the cleaning element that was carried to the head while the cleaning element is fixed with respect to the head.

* * * * *